ANALOG TO DIGITAL CONVERTERS

Filed June 28, 1961 3 Sheets-Sheet 1

INVENTORS
CHARLES H. SIE &
LEROY H. WERNER
BY
Carl V. Olson
ATTORNEY

May 25, 1965 C. H. SIE ETAL 3,185,977

ANALOG TO DIGITAL CONVERTERS

Filed June 28, 1961 3 Sheets-Sheet 2

INVENTORS
CHARLES H. SIE &
LEROY H. WERNER
BY Carl V. Olson
ATTORNEY

INVENTORS
CHARLES H. SIE &
LEROY H. WERNER
BY Carl V. Olson
ATTORNEY

United States Patent Office 3,185,977
Patented May 25, 1965

3,185,977
ANALOG TO DIGITAL CONVERTERS

Charles H. Sie, Pennsauken, N.J., and Leroy H. Werner, Levittown, Pa., assignors to Radio Corporation of America, a corporation of Delaware Filed June 28, 1961, Ser. No. 120,275
3 Claims. (Cl. 340—347)

This invention relates to analog to digital converters.

It is the general object of this invention to provide an improved analog to digital converter system, including magnetic cores, which serves to translate the amplitude of an analog signal to a corresponding digital signal which may be in the form of a plurality of binary digits.

In one specific aspect, the invention comprises a plurality of sequentially arranged magnetic cores each of which is provided with an analog input winding. An input analog signal is applied through all of the analog windings to produce magnetomotive forces which are equal in all of the cores. The cores are also provided with fixed bias windings in a scheme (according to the binary number system) such that the number of turns on each core is half that on the preceding core. Each core is also provided with a read-out winding and a sense winding. All cores except the first are provided with at least one conditional bias winding. The sense winding on each core is connected to a switch circuit which conditionally supplies a bias current to conditional windings on the succeeding cores. In operation, a read-out signal is applied to the read-out winding of the first core. The presence or absence of an induced pulse in the sense winding of the first core then depends on the relative magnitudes of the analog magnetomotive force and the bias magnetomotive force in the first core. If the analog magnetomotive force is greater, the switch circuit is energized to provide a conditional bias current to the conditional bias windings on the succeeding cores. The operation continues in like fashion by the successive application of read-out currents to the read-out windings of the following or succeeding cores. Output signals taken from the sense windings provide the respective binary digits corresponding to the value of the input analog signal amplitude.

These and other objects and aspects of the invention will be apparent to those skilled in the art from the following more detailed description taken in conjunction with the appended drawings, wherein.

Figure 1:
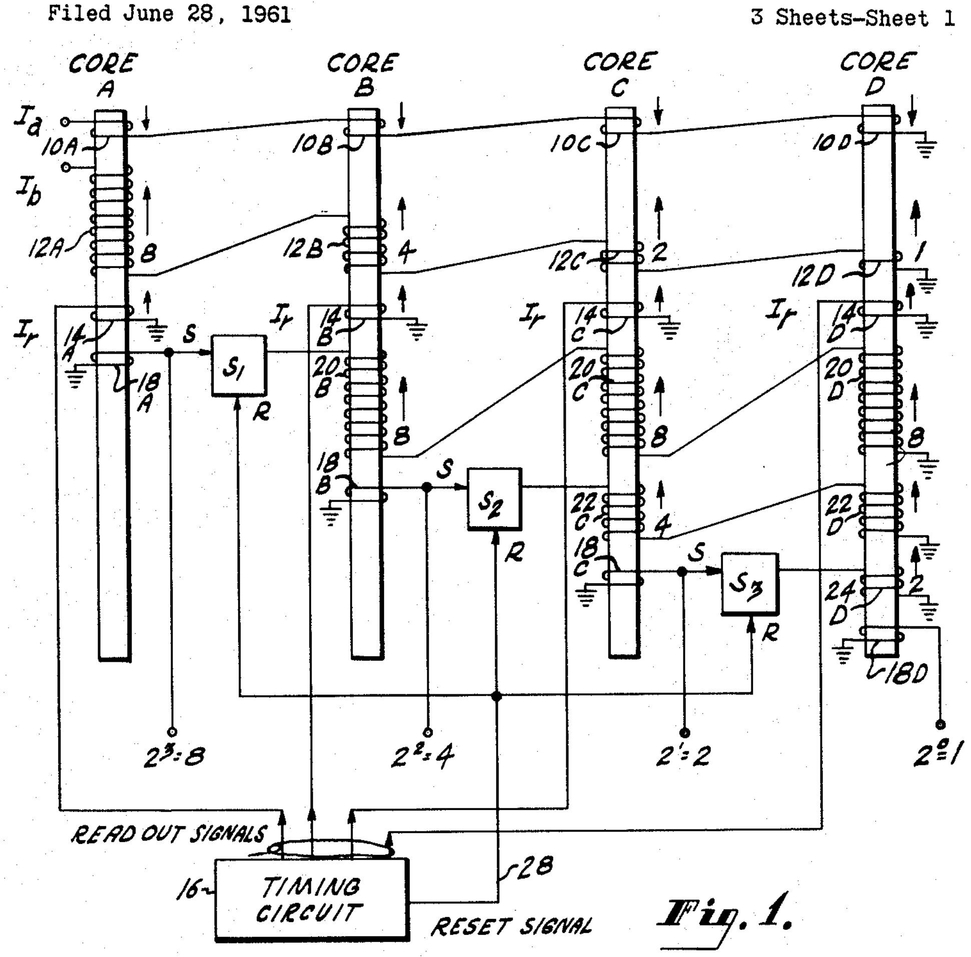
FIGURE 1 is a diagram of an analog to digital converter providing a four-digit binary output signal.

FIGURE 1 shows an example of the invention employing four magnetic cores A, B, C and D for translating an analog signal into a four-digit binary coded signal. The cores may be annular in shape, and they are illustrated edge-on for the purpose of simplifying the illustration of the winding connections. The cores are provided with respective analog windings 10A through 10D. The analog windings contain an equal number of turns and are all supplied with the same input analog current from an analog input terminal $I_a$.

The cores are also provided with fixed bias windings 12A through 12D which have progressively fewer turns. The fixed bias winding on any one core has half as many turns as the fixed biased winding on the preceding core. All of the bias windings described, and to be described, are arranged so that currents applied to the windings result in magnetomotive forces in a direction opposite to the direction of the magnetomotive force produced by the analog signal in the analog windings 10A through 10D. The fixed bias winding 12A on core A has a number of turns which will provide a bias magnetomotive force equal to substantially one half the magnetomotive force provided by the maximum analog signal applied to the analog input terminal $I_a$. In the present example, it is assumed that an input analog signal varies between zero and 15 units (making a total of 16 quantizable levels). Therefore, the winding 12A is represented as having eight turns. The fixed bias windings 12B on core B is represented as having half as many turns, namely four; the bias winding 12C has two; and the bias winding 12D has one. It will be understood that these numbers represent relative values rather than actual numbers of turns.

The magnetic cores A to D are provided, respectively, with individual read-out windings 14A through 14D which are connected to a timing circuit 16. The timing circuit 16 supplies read-out currents in sequential fashion to the read-out windings 14A through 14D. The cores A to D are additionally provided, respectively, with individual sense windings 18A through 18D. The cores B, C and D are provided, respectively, with conditional bias windings 20B, 20C and 20D which, when energized, provide the same amount of magnetomotive force (eight units) as is provided by fixed bias winding 12A on core A. The sense winding 18A on core A is connected to a switching circuit $S_1$ which conditionally supplies current to conditional bias windings 20B, 20C and 20D. In like fashion, the sense winding 18B on core B is connected to a switch circuit $S_2$ which conditionally supplies current to conditional bias windings 22C and 22D on cores C and D, respectively; and sense winding 18C is connected to a switch circuit $S_3$ which conditionally supplies current to conditional bias winding 24D on core D. The sense windings 18A through 18D are connected to respective digit output terminals $2^3$, $2^2$, $2^1$ and $2^0$. The timing circuit 16 supplies a reset signal over line 28 to all of the switch circuits $S_1$, $S_2$ and $S_3$.

Figure 3:
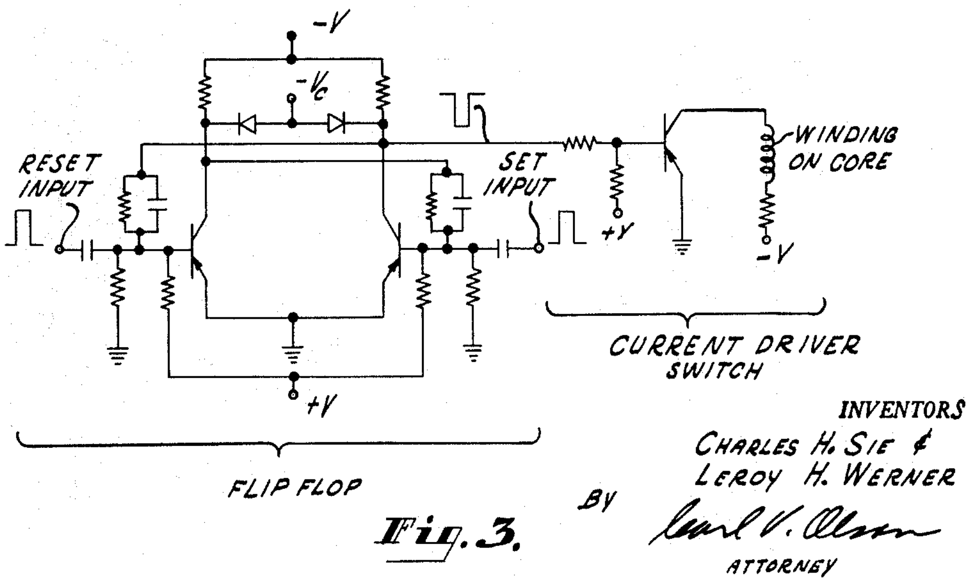
FIGURE 3 is a circuit diagram of a switch circuit which may be substituted in the boxes S in the system of FIGURE 1.

The switch circuits $S_1$, $S_2$ and $S_3$ each may include any appropriate circuit performing the functions of a flip-flop multivibrator and a current driver. FIGURE 3 illustrates a suitable known transistor circuit for performing these functions. Therefore, the circuit of FIGURE 3 may be substituted into the boxes in FIGURE 1 which are labeled $S_1$, $S_2$ and $S_3$.

Figure 2:
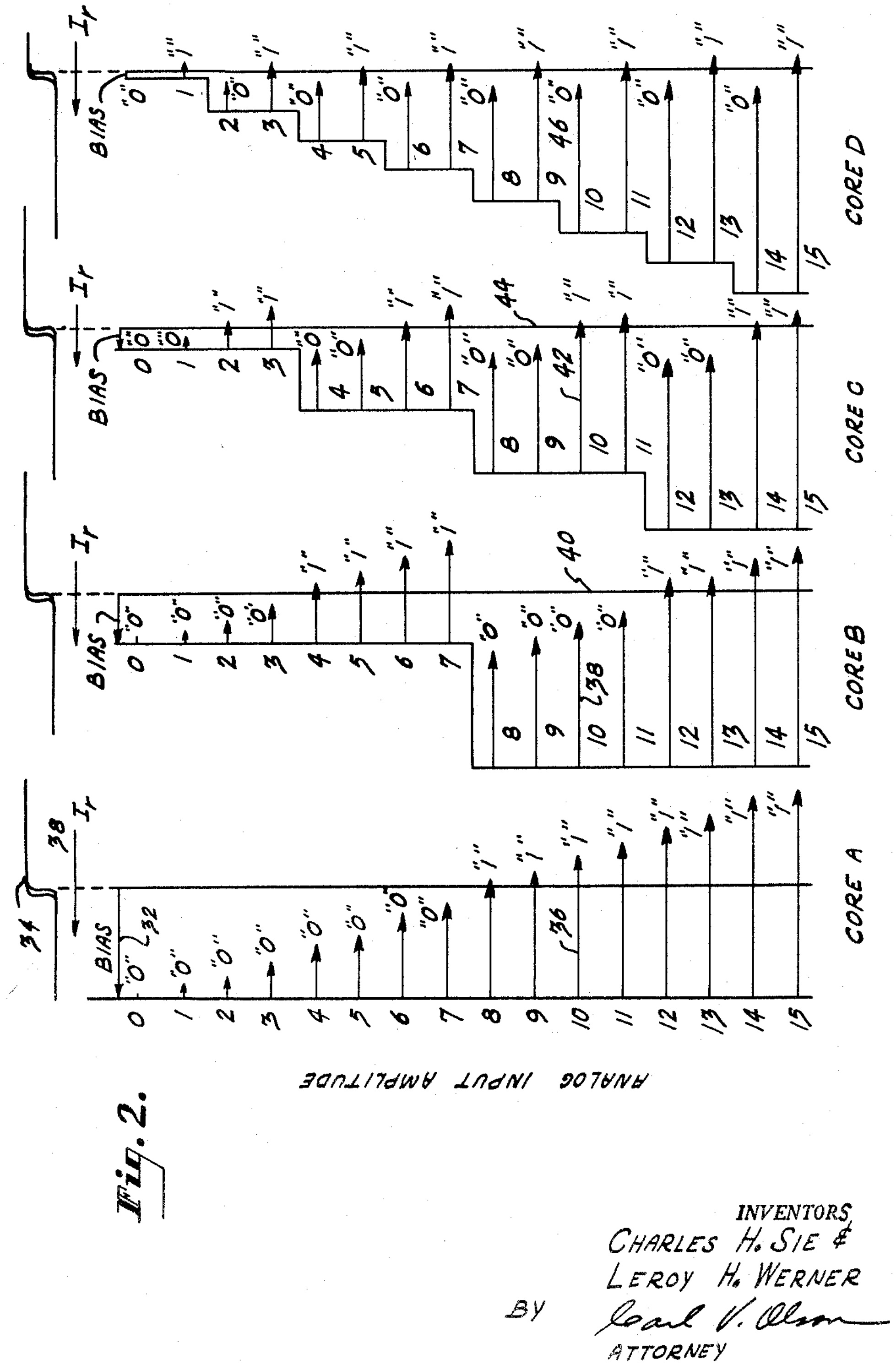
FIGURE 2 is a chart which will be referred to in describing the operation of the converter of FIGURE 1.

FIGURE 2 is a chart illustrating the operation of the analog to digital converter of FIGURE 1 for all values of analog input signal between 0 and 15 units of amplitude. The operation of the converter of FIGURE 1 can be understood by considering an example wherein the input analog signal is equal to, say, 10 units. Referring to FIGURE 2, a bias of eight units of magnetomotive force provided by bias winding 12A is represented by the amount 32 extending to the left from the threshold of the hysteresis loop characteristic 34 of the core A. This bias of eight units is overcome by the opposite magnetomotive force of ten units provided by the analog winding 10A as shown by the arrow 36 in the chart of FIGURE 2. A read-out current $I_r$ applied to the read-out winding 14A produces a magnetomotive force in a direction 38 opposite to that of the analog magnetomotive force, so that there results a switching of the magnetic core A from a condition of saturation in one direction to a condition of saturation in the opposite direction. Therefore, an output pulse is induced in the sense winding 18A and a binary digit "1" output signal appears at the binary output terminal $2^3$. The switch circuit $S_1$ is responsive only to switches of the core A in the direction 38 in which the read-out signal $I_r$ acts.

The signal induced in the sense winding 18A as a result of the switching of the core by the read-out current $I_r$ causes the switch circuit $S_1$ to supply a conditional bias current to all of the conditional bias windings 20B, 20C and 20D. Core B then has a bias of four plus eight or twelve units in a direction opposing the analog signal of ten units due to the current in analog winding 10B. The result, as shown in the chart of FIGURE 2, is that the analog magnetomotive 38 in core B is not sufficient to cross the threshold 40, and when the read-out current $I_r$ is applied through the read-out winding 14B, there is no switching of the core. Consequently, there is no signal induced in the sense winding 18B of core B. A binary digit "0" output signal thus appears at the binary output terminal $2^2$. The conditional bias windings 22C and 22D are not supplied with current by the switch circuit $S_2$.

The bias on the core C is two units from the fixed bias winding 12C and is eight units from the conditional bias winding 20C. The analog signal value of 10 units applied to the analog winding 10C of core C has an amplitude and direction as illustrated by the arrow 42 in FIG. 2 such that it just exceeds the biases and crosses the threshold 44. When a read-out signal $I_r$ is applied to the read-out winding 14C, the core C is switched back with the result that a "1" output signal is induced in the sense winding 18C. The "1" output signal appears on the digital output signal terminal $2^1$, and causes the switched circuit $S_3$ to supply two units of bias magnetomotive force to the conditional bias winding 24D.

The bias on the core D now consists of one unit due to the fixed bias winding 12D, eight units due to the conditional bias winding 20D and two units due to the conditional bias winding 24D making a total of 11 units. The analog magnetomotive force 46 of ten units is less than the total bias of eleven units, with the result that when the read-out current $I_r$ is applied to the read-out winding 14D, there is no switching of the core D. Therefore, a "0" output signal is provided at the output terminal $2^0$. The analog input of ten units is thus translated to the corresponding binary number "1010" which is available at the output terminals.

After the digital output is provided, the timing circuit 16 applies a reset signal over the line 28 to reset the flip-flop multivibrators in all of the switch circuits $S_1$, $S_2$ and $S_3$. Thereafter, the circuit is ready to receive and convert the next succeeding value of the analog signal applied to the terminal $I_a$. If the input analog signal is one which varies considerably in the interval required for the converting process, the input analog should preferably be sampled and applied to the converter as a level which is maintained for the interval between successive reset signals from the timing circuit 16. In this event, a synchronizing connection is used between the apparatus employed for sampling the analog signal and the timing circuit 16.

Figure 4:
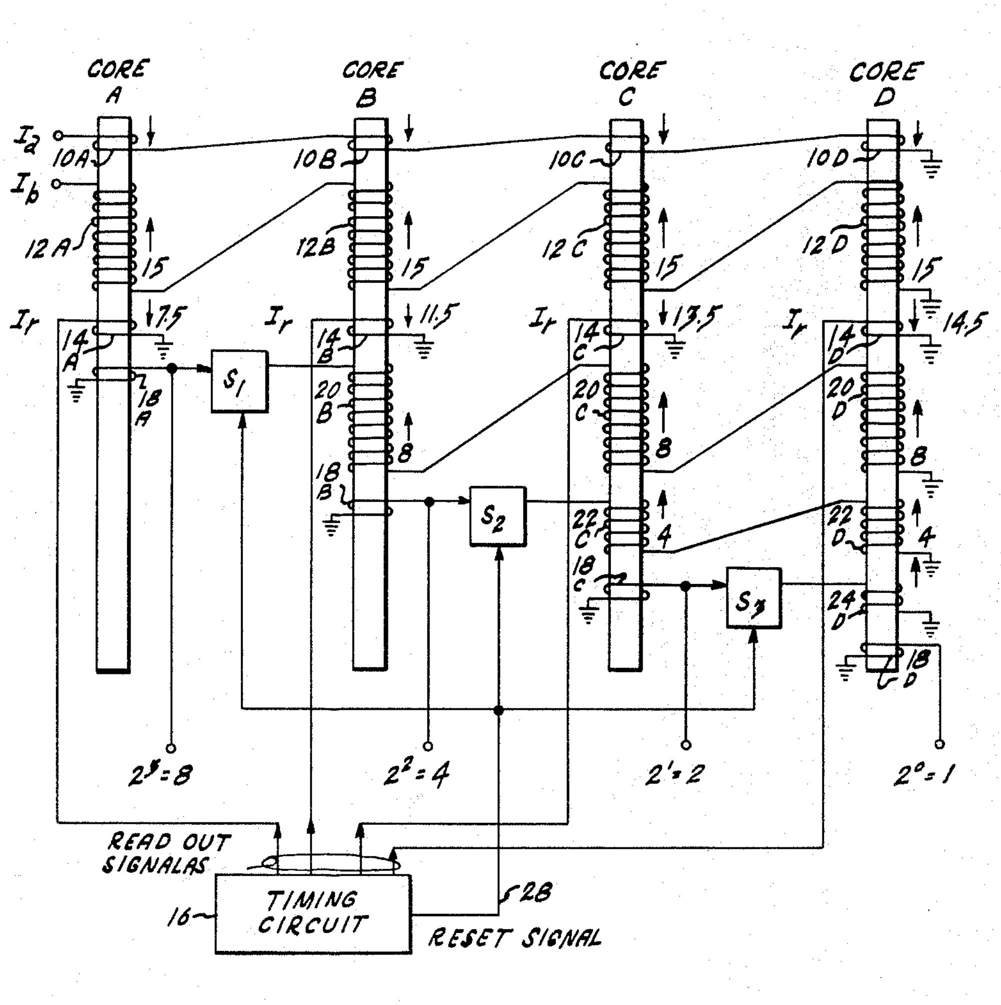
FIGURE 4 is a diagram of a modified form of analog to digital converter capable of faster operation.

The system of FIGURE 1 may be modified according to FIGURE 4 to provide a mode of operation differing from the one illustrated in the charts of FIGURE 2; namely, a mode of operation wherein all the cores are permanently biased enough so that they do not switch when the analog signal is applied and wherein read-out signal $I_r$ of accurately controlled amplitude produce a magnetomotive force in the same direction as the analog signal to selectively produce switching of the cores. The cores switch only when the sum of the analog signal and the read-out signal is sufficient to overcome the bias.

The system of FIGURE 4 differs from the system of FIGURE 1 in that all the bias windings 12A, 12B, 12C and 12D are arranged to provide equal bias magnetomotive forces of fifteen units, a value which is at least equal to the highest analog magnetomotive force value for which the system is designed . The read-out signals $I_r$ applied to read-out windings 14A, 14B, 14C and 14D are arranged to provide read-out magnetomotive forces of 7.5, 11.5, 13.5 and 14.5 respectively. In other respects the system of FIGURE 4 is like that of FIGURE 1.

In the operation of the system of FIGURE 4, the input analog magnetomotive force is never sufficient by itself to exceed the bias magnetomotive force of fifteen units. The read-out magnetomotive force in each core has an amplitude such that, when added to the analog magnetomotive force, it causes a switching of the core when a binary "1" digit should be produced. This mode of operation permits faster operation by minimizing the number of times that the cores are switched from one state to another.

What is claimed is:

1. An analog to digital converter comprising a number of successive magnetic cores equal to the number of desired digital outputs, equal input analog signal windings on all of said cores, means to couple an analog input signal to all of said analog signal windings to produce equal analog magnetomotive forces in all of said cores, different fixed bias windings on each of said cores, means to apply a fixed bias current to said fixed bias windings to produce a bias magnetomotive force in each successive core which is equal and opposite to the magnetomotive force produced by a progressively different lower value of analog signal, a read-out winding and a sense winding on each core, conditional bias windings on all but the first of said cores, a switch circuit connected from the sense winding of each core except the last to conditional bias windings on successive cores, means to successively apply read-out currents to said read-out windings to cause the switch circuit corresponding with each core to sense the relative magnitudes of the opposing analog and bias forces in the respective core and applies a corresponding conditional bias to successive cores, and means to derive successive digital output signals from said sense windings.

2. An analog to digital converter comprising a number of successive magnetic cores equal to the number of desired digital outputs, equal input analog signal windings on all of said cores, means to couple an analog input signal to all of said analog signal windings to produce equal analog magnetomotive forces in all of said cores, different fixed bias windings on each of said cores, means to apply a fixed bias current to said fixed bias windings to produce a bias magnetomotive force in each successive core which is equal and opposite to the magnetomotive force produced by a progressively different lower value of analog signal, a read-out winding and a sense winding on each core, conditional bias windings on all but the first of said cores, a switch circuit connected from the sense winding of each core except the last to conditional bias windings on successive cores, means to successively apply read-out currents to said read-out windings, the switch circuit corresponding with each core being operative when the analog force exceeds the bias forces in the respective core to energize the corresponding conditional bias windings on successive cores, and means to derive successive digital output signals from said sense windings.

3. An analog to digital converter comprising a number of successive magnetic cores equal to the number of desired digital outputs, equal input analog signal windings on all of said cores, means to couple an analog input signal to all of said analog signal windings to produce equal analog magnetomotive forces in a first direction in all of said cores, different fixed bias windings on each of said cores, means to apply a fixed bias current to said fixed bias windings to produce a bias magnetomotive force in an opposite direction in each successive core, the bias force in each successive core being equal in magnitude to the magnetomotive force produced by a progressively different lower value of analog signal, a read-out winding and a sense winding on each core, switch circuits for all cores except the last one, each said switch circuit having a control input connected to the sense winding of a respective core and having an output, sets of conditional bias windings, each set being connected to a respective switch output and being located on all successive cores to produce therein magnetomotive forces in said opposite direction, means to successively apply read-out currents to said read-out windings to produce magnetomotive forces in said first direction, the switch circuit corresponding with each core being operative when the analog force exceeds the bias forces in the respective core, and the read-out current thus causes a switching of the flux direction, to energize the corresponding conditional bias windings on successive cores, and means to derive successive digital output signals from said sense windings.

References Cited by the Examiner

UNITED STATES PATENTS 3,123,817 3/64 Golden ---------------- 340—347

MALCOLM A. MORRISON, *Primary Examiner.*